United States Patent [19]

Lu

[11] Patent Number: 5,031,228

[45] Date of Patent: Jul. 9, 1991

[54] IMAGE RECOGNITION SYSTEM AND METHOD

[75] Inventor: Daozheng Lu, Dunedin, Fla.

[73] Assignee: A. C. Nielsen Company, Northbrook, Ill.

[21] Appl. No.: 244,492

[22] Filed: Sep. 14, 1988

[51] Int. Cl.$^5$ .......................... G06K 9/68; H04N 7/00
[52] U.S. Cl. ........................................ 382/38; 382/34; 358/84
[58] Field of Search .................. 382/30, 16, 34, 8, 37, 382/2, 38; 358/84; 340/825.31, 825.34; 379/92

[56] References Cited

U.S. PATENT DOCUMENTS 4,611,347  9/1986  Netravali et al. ...................... 382/34
4,885,785  12/1989  Reynolds et al. ...................... 382/34

Primary Examiner—Leo H. Boudreau
Attorney, Agent, or Firm—Mason, Kolehmainen, Rathburn & Wyss

[57] ABSTRACT

An image recognition system and method are provided for identifying a pattern of a plurality of predetermined patterns in a video image. A plurality of feature image signatures are stored corresponding to each of the plurality of predetermined patterns. A universal feature image signature is stored that includes each of the stored feature image signatures. A predefined series of portions of a captured video image is sequentially compared with the universal feature image signature to identify matching portions. Each of the identified matching video image portions is compared with the stored feature image signatures to identify the predetermined pattern.

40 Claims, 6 Drawing Sheets

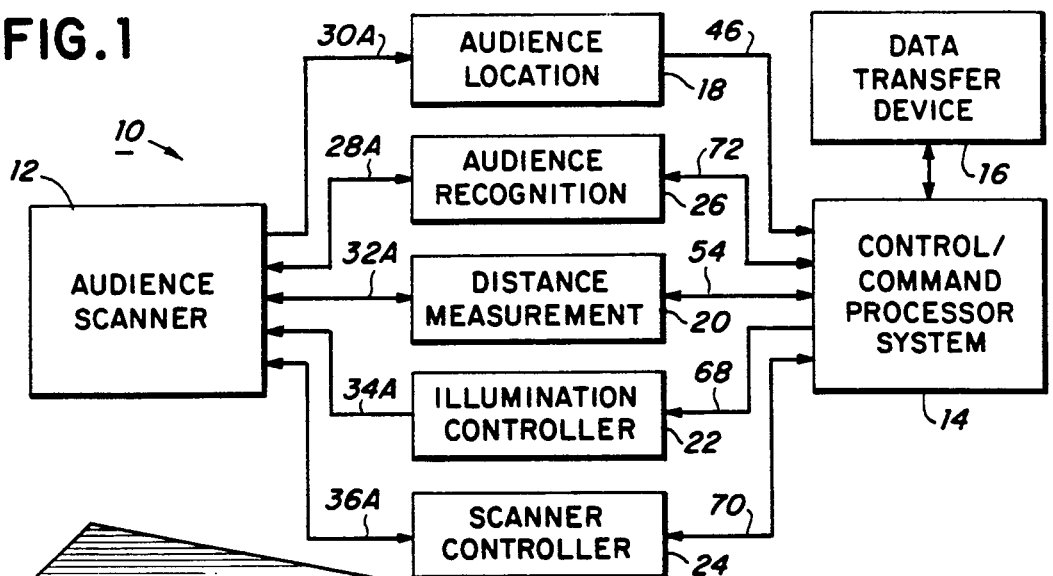
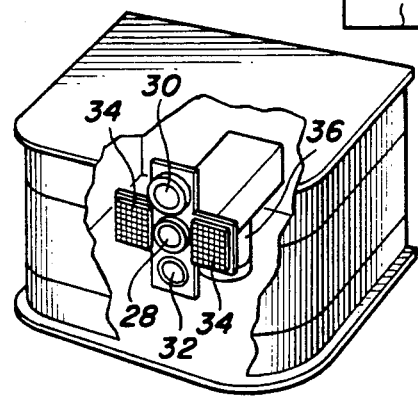
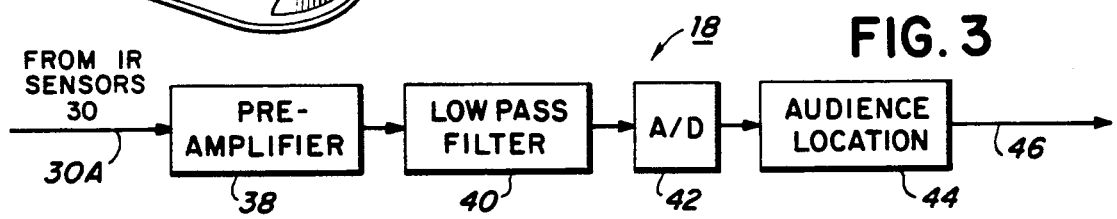
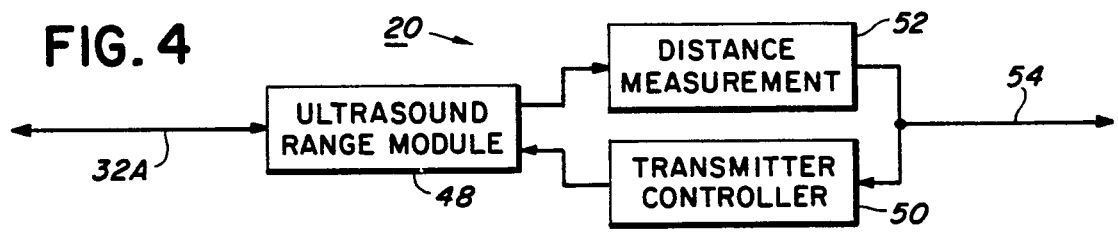
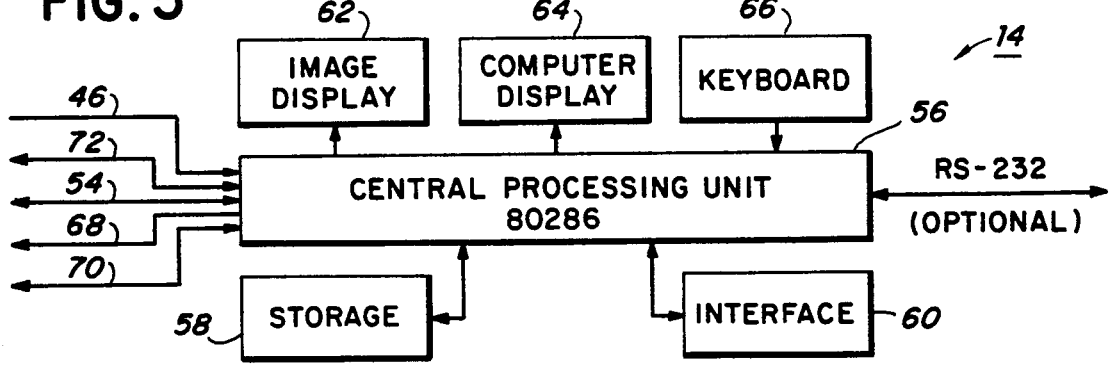

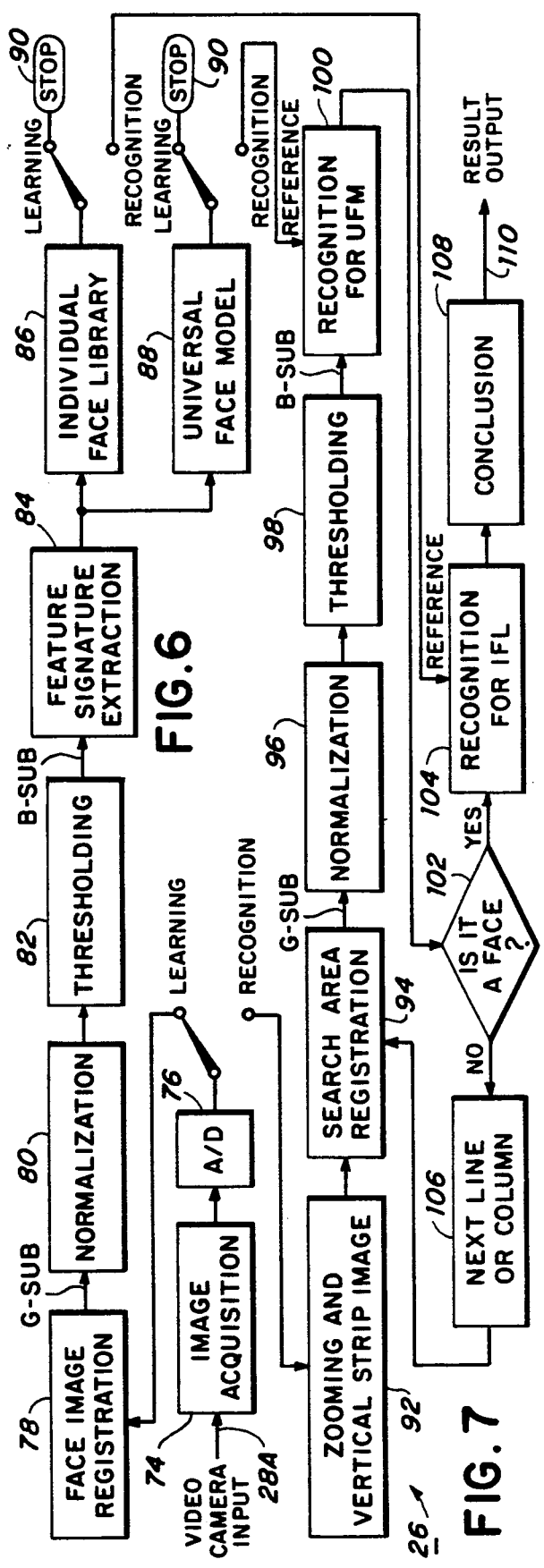
FIG. 6
FIG. 7
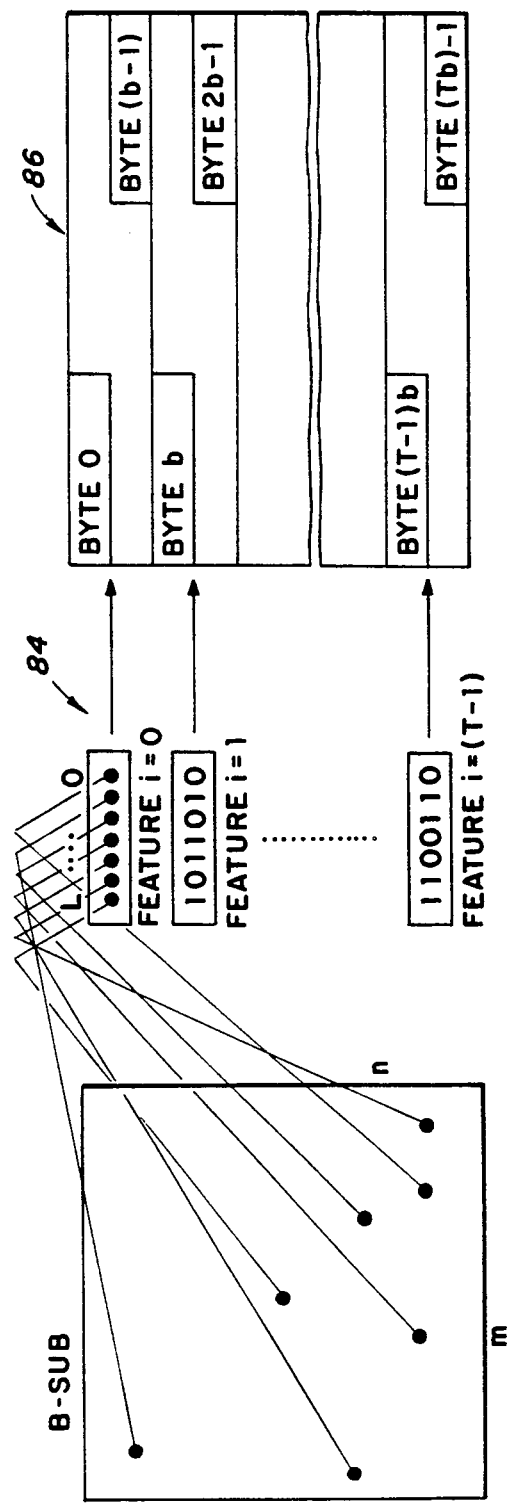
FIG. 6A

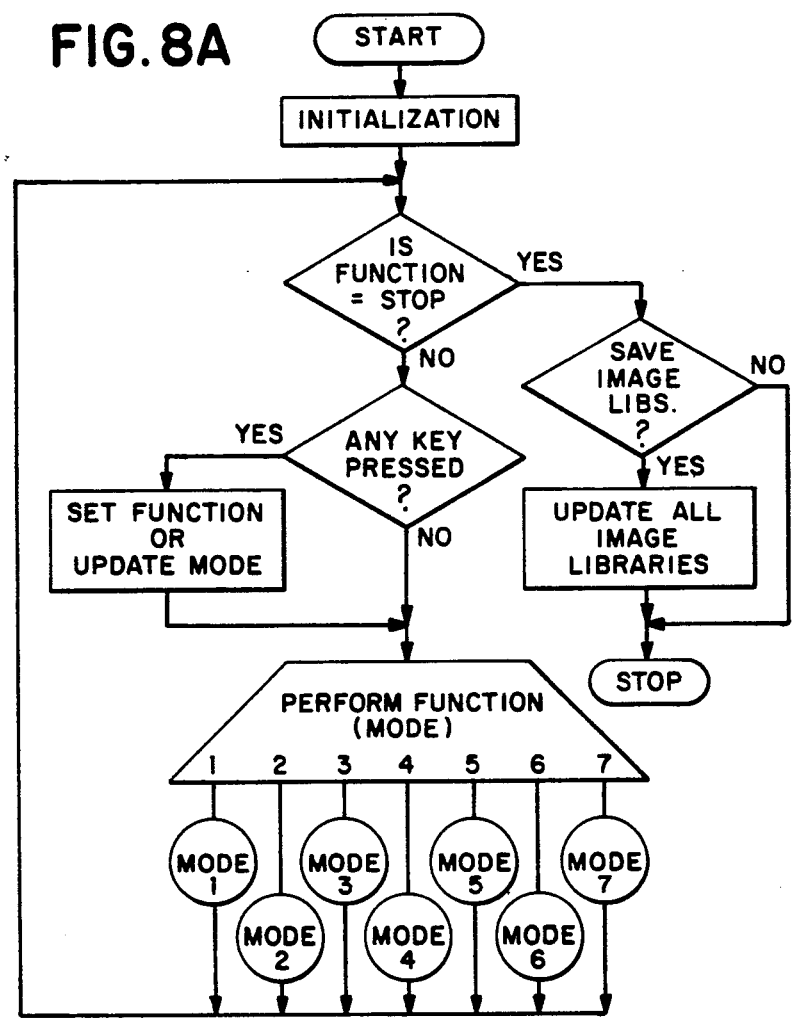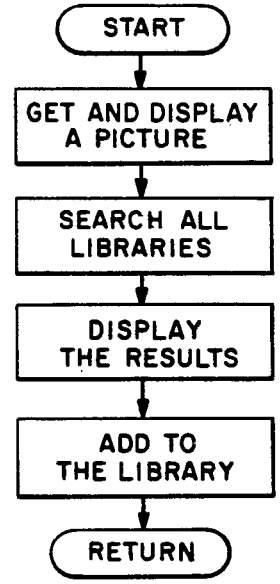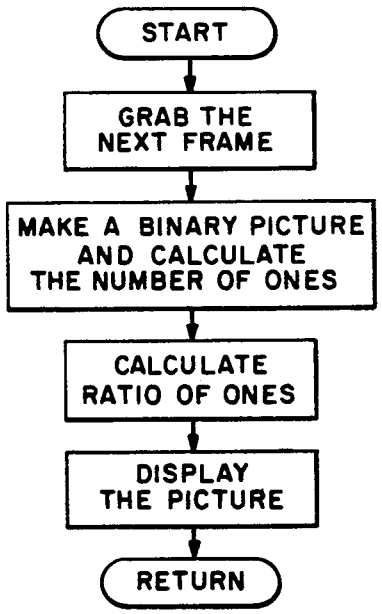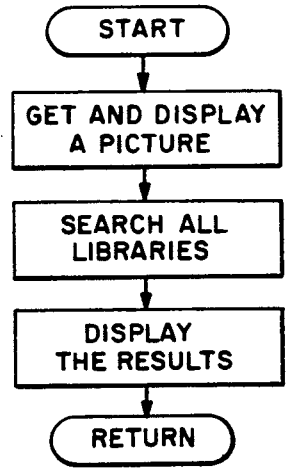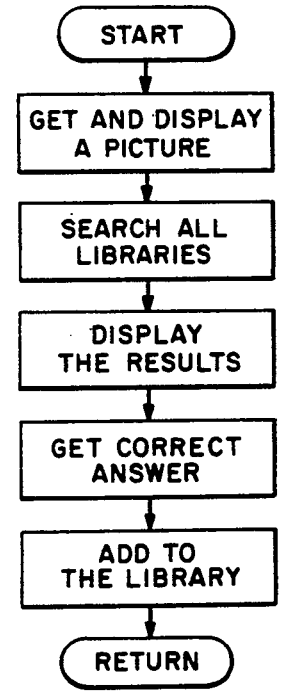

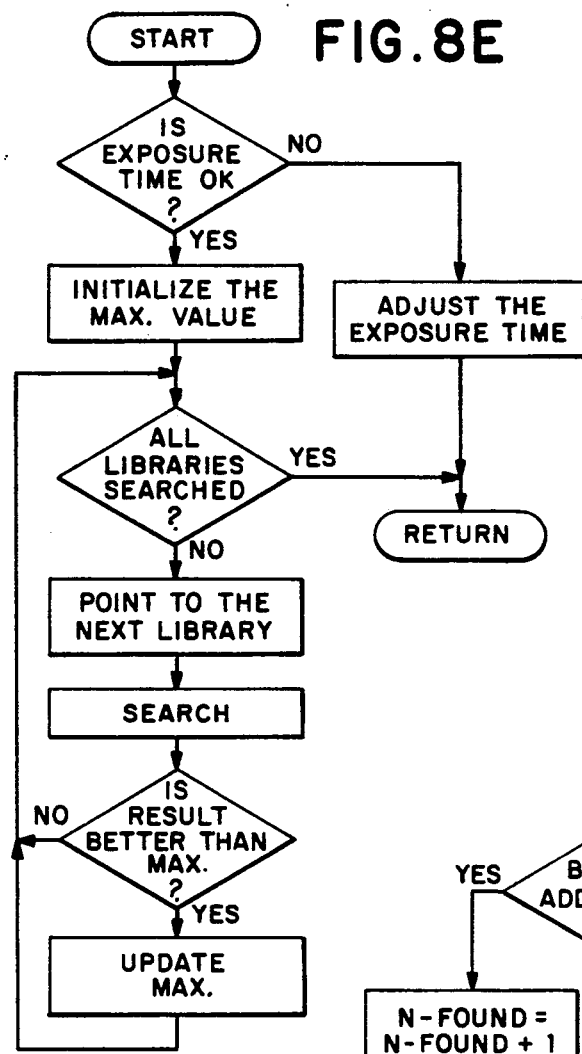
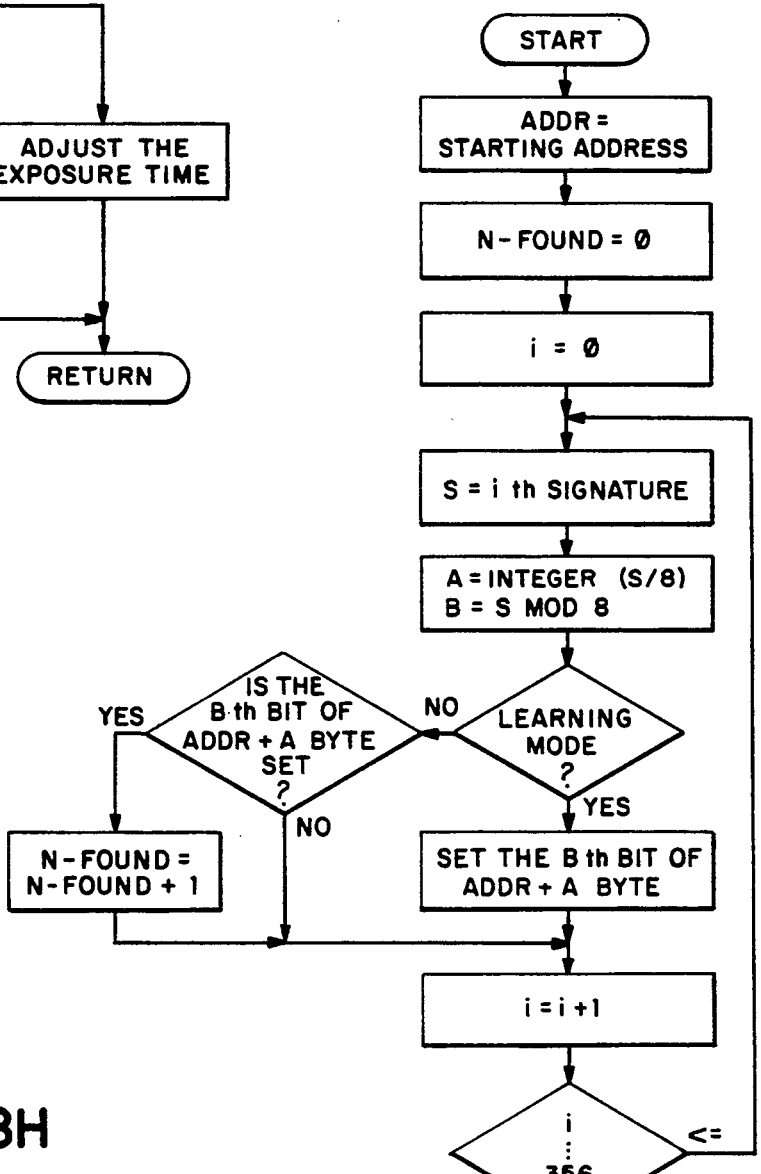
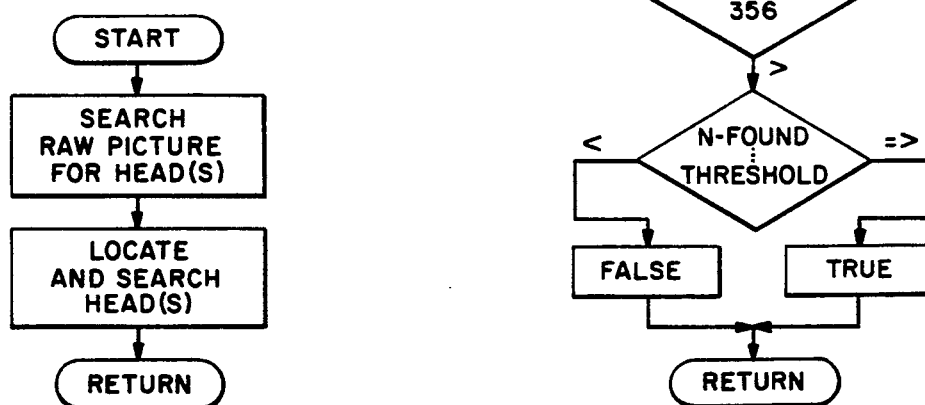

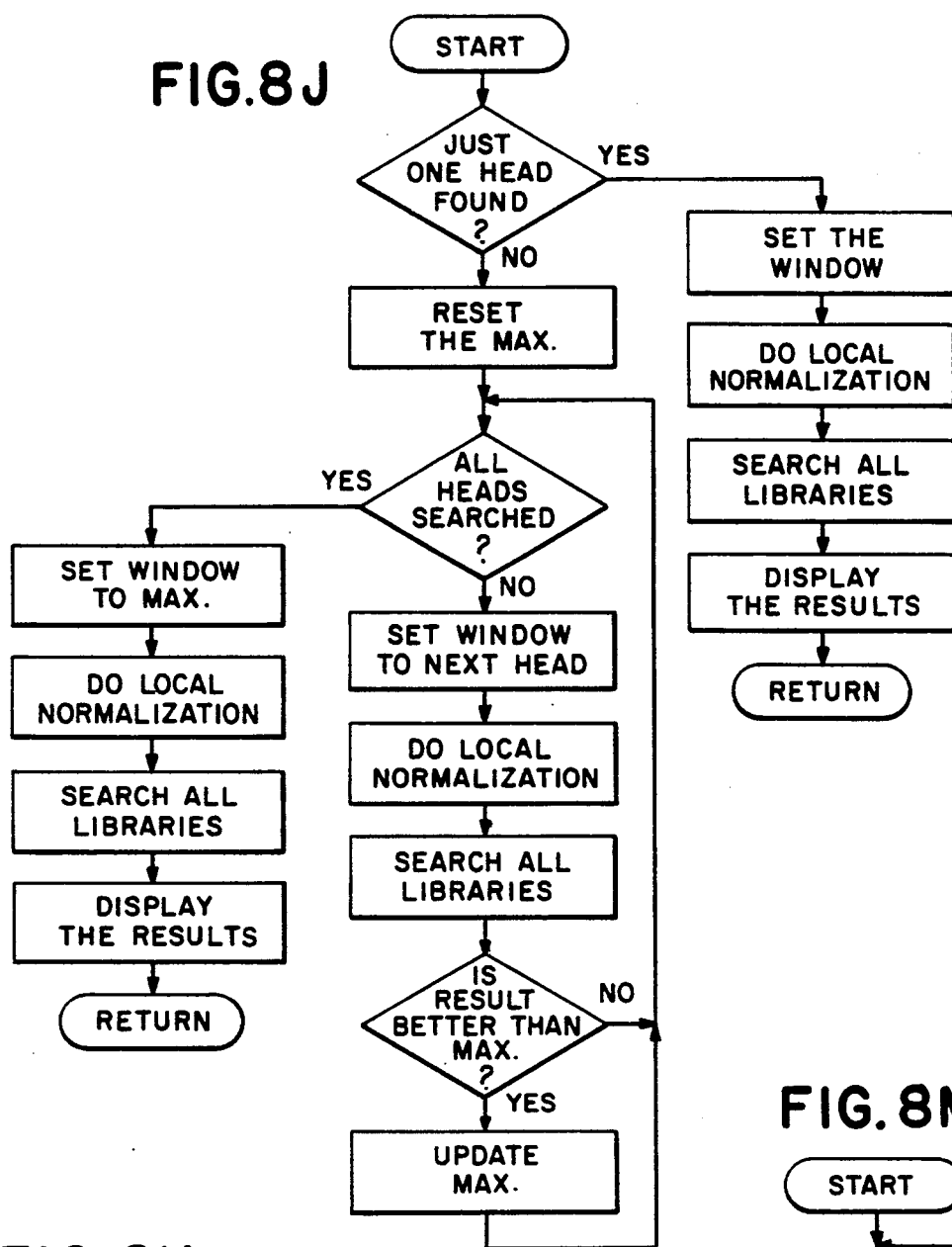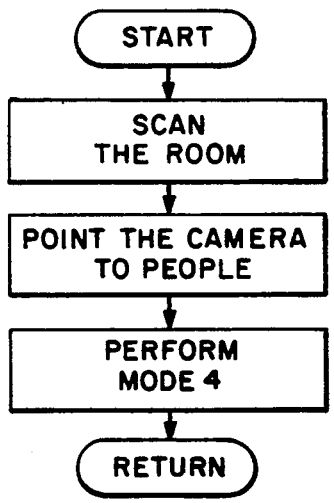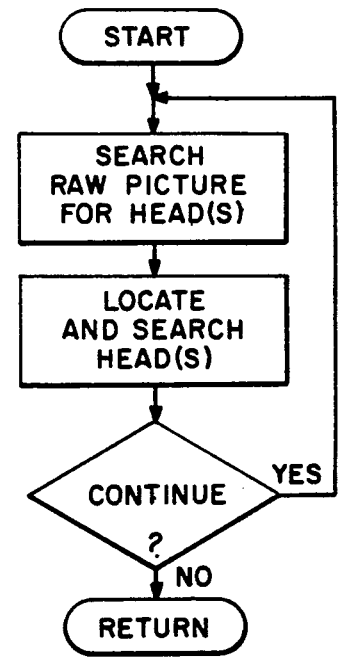

IMAGE RECOGNITION SYSTEM AND METHOD

BACKGROUND OF THE INVENTION

Related Application

A related application is entitled "IMAGE RECOGNITION AUDIENCE MEASUREMENT SYSTEM AND METHOD", U.S. Pat. No. 4,858,000, filed Sept. 14,1988 the same date as the present application by the present inventor Daozheng Lu and assigned to the same assignee.

A. Field of the Invention

The present invention relates generally to image recognition systems, and more particularly to image recognition systems and methods for use with television audience measurement and marketing data collection systems.

B. Description of the Prior Art

Manual systems for determining the viewing/listening habits of the public are prone to inaccuracies resulting from the entry of erroneous data that may be intentionally or unintentionally entered and are slow in acquiring data.

U.S. Pat. No. 3,056,135 to Currey et al. issued Sept. 25, 1962 and assigned to the same assignee as the present application describes a method and apparatus for automatically determining the listening habits of wave signal receiver users The method disclosed in Currey et al. provides a record of the number and types of persons using a wave signal receiver by monitoring the operational conditions of the receiver and utilizing both strategically placed switches for counting the number of persons entering, leaving and within a particular area and a photographic recorder for periodically recording the composition of the audience A mailable magazine provides a record of both the audience composition and the receiver operation information for manual processing by a survey organization. Thus a disadvantage is that acquiring data is slow and further many viewing audience members object to being identified from the photographic record.

U.S. Pat. No. 4,644,509 to Kiewit el al. issued Feb. 17, 1987 and assigned to the same assignee as the present application discloses an ultrasonic, pulse-echo method and apparatus for determining the number of persons in the audience and the composition of the audience of a radio receiver and/or a television receiver. First and second reflected ultrasonic wave maps of the monitored area are collected, first without people and second with people who maybe present in the monitored area. The first collected background defining map is subtracted from the second collected map to obtain a resulting map. The resulting map is processed to identify clusters having a minimum intensity. A cluster size of the thus identified clusters is utilized to identify clusters corresponding to people in an audience. While this arrangement is effective for counting viewing audience members, individual audience members can not be identified.

Various image recognition arrangements and systems are known for recognizing patterns within a captured video image. However, the conventional pattern recognition systems are impractical and uneconomical for identifying individual audience members of a viewing audience due to the vast information storage and computing requirements that would be needed in the conventional systems It is desirable to provide an image recognition system having the capability to identify individual members of the viewing audience.

SUMMARY OF THE INVENTION

It is an object of the present invention to provide a method and system for determining the viewing habits of the public that overcome many of the disadvantages of the prior art systems.

It is an object of the present invention to provide an image recognition method and system for identifying predetermined individual members of a viewing audience in a monitored area.

It is an object of the present invention to provide an image recognition method and system for identifying a pattern of a plurality of predetermined patterns in a video image.

It is an object of the present invention to provide an image recognition method and system for identifying a pattern of a plurality of predetermined patterns in a video image utilizing improved feature signature extraction and storage techniques.

Therefore, in accordance with a preferred embodiment of the invention, there are provided an image recognition method and system for identifying a pattern of a plurality of predetermined patterns in a video image. A plurality of feature image signatures are stored corresponding to each of the plurality of predetermined patterns. A universal feature image signature is stored that includes each of the stored feature image signatures. A predefined series of portions of a captured video image is sequentially compared with the universal feature image signature to identify matching portions. Each of the identified matching video image portions is compared with the stored feature image signatures to identify the predetermined pattern.

In accordance with a feature of the invention, each of the plurality of feature image signatures and the universal feature image signature are stored in a distinct memory space of a predetermined capacity. The feature image signatures are generated by processing a plurality of video images of the pattern to be identified. A signature from each of the processed video images is extracted and stored in the corresponding predetermined memory space for the particular pattern and in the predetermined memory space for the universal feature image signature.

A feature image signature is stored corresponding to each predetermined individual member's face of a viewing audience. An audience scanner includes audience locating circuitry for locating individual audience members in the monitored area. A video image is captured and processed for a first one of the located individual audience members. A portion of the processed video image is identified that matches a stored universal image signature that includes each of the feature image signatures. The identified portion, is compared with the stored feature image signatures to identify the audience member. These steps are repeated to identify all of the located individual audience members in the monitored area.

DESCRIPTION OF THE DRAWING

These and other objects and advantages of the present invention will become readily apparent upon consideration of the following detailed description and attached drawing wherein:

FIG. 1 is a block diagram of the image recognition system according to the present invention;

FIG. 2 is a perspective view partly broken away to show interior details of an audience scanner of the image recognition system of FIG. 1;

FIG. 3 is a block diagram of an audience location subsystem of the image recognition system of FIG. 1;

FIG. 4 is a block diagram of a distance measurement subsystem of the image recognition system of FIG. 1;

FIG. 5 is a block diagram of a control command processor subsystem of the image recognition system of FIG. 1;

FIG. 6 is a block diagram of a learning functional portion of an audience recognition subsystem of the image recognition system of FIG. 1;

FIG. 6A is a graphical representation of a binary subimage and feature identifying logic for extracting and storing an image signature of the image recognition system of FIG. 1;

FIG. 7 is a block diagram of a recognition functional portion of the audience recognition subsystem of the image recognition system of FIG. 1;

FIGS. 8A-8M are flow charts illustrating the logical steps performed by the image recognition system of FIG. 1.

DETAILED DESCRIPTION OF THE PREFERRED EMBODIMENT

Figure 8I:
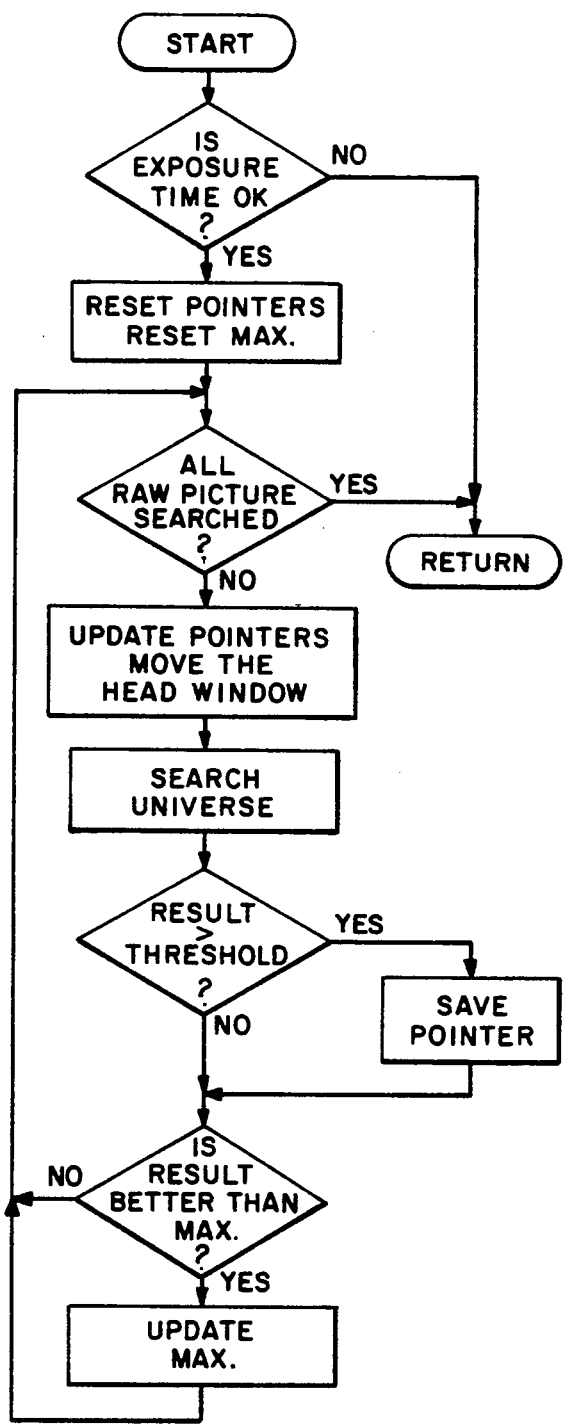

Referring now to the drawing, with particular attention to FIG. 1, there is illustrated a block diagram of a new and improved image recognition system according to the invention generally designated by the reference numeral 10. While the image recognition system 10 is depicted and generally described herein for use with a television receiver to identify individual members of a viewing audience, the principles of the present invention are also applicable to other image recognition systems As its major components, the image recognition system 10 includes an audience scanner 12 for scanning and capturing an image of the viewing audience members within a monitored area, and a control command processor subsystem 14 for performing control operations and for storing and processing captured images. A data transfer device 16 is used for periodically transferring stored data to a central computer (not shown) of the television audience measurement and/or marketing data collection systems. The image recognition system 10 includes an audience location subsystem 18 illustrated in FIG. 3 for locating the audience members within the monitored area, a distance measurement subsystem 20 illustrated in FIG. 4 for identifying the distance between audience members and the audience scanner 12, an illumination controller 22 and a scanner controller 24 for providing illumination and motor control signals to the audience scanner 12. An audience recognition subsystem 26 for learning and for recognizing feature image signatures of the audience members is illustrated in FIGS. 6 and, 7.

Referring also to FIG. 2, the audience scanner 12 includes a video camera 28 providing a video image signal at a line 28A that is applied to the audience recognition subsystem 26. An infrared video camera, for example, such as a Model CCD1200 IR Microcam, manufactured and sold by Electrophysics Corporation of Nutley, N.J., may be employed for the video camera 28. An infrared sensor 30 provides a sensed infrared signal at a line 30A that is applied to the audience location subsystem 18. A parallel opposed dual pyroelectric infrared detector used in conjunction with an optic focusing device including a pair of fixed surface mirrors and a Fresnel lens, may be used for the infrared sensor 30, for example, such as an Eltec Model 4192 and an Eltec Model 826C manufactured and sold by Eltec Instruments, Inc. of Daytona Beach, Fla. An ultrasound transducer 32, such as a 50 KHz electroprocessor static transducer, for transmitting and for receiving ultrasonic signals provides a distance pulse echo signal at a line 32A that is applied to the distance measurement subsystem 20.

A pair of infrared illumination devices 34 for illuminating the monitored area are operatively controlled by the illumination controller 22. A Model IRL200 infrared room illuminator manufactured and sold by Electrophysics Corporation of Nutley, N.J., may be employed for the illumination devices 34, although various illumination devices such as infrared lasers, light emitting diodes or a filtered flash lamp can be used. A scanner drive 36, such as a stepping motor is operatively controlled by the scanner controller 24 for stepwise angular rotation of the video camera 28 for scanning the monitored area.

FIG. 3 provides a block diagram of an audience location subsystem 18 of the image recognition system 10. The sensed voltage signal output of the infrared sensor 30 at line 30A corresponds to the temperature distribution of the monitored area. The sensed infrared signal at line 30A is applied to a preamplifier device 38. The amplified infrared signal is applied to a low pass filter 40 for providing a filtered infrared signal that is applied to an analog-to-digital A/D converter 42 which generates a digital representation of the processed infrared signal. The digitized signal is applied to an audience location computation logic circuit 44 to identify directions within the monitored area corresponding to the possible locations of individual audience members. The identified directions signal at a line 46 is applied to the control command processor subsystem 14.

Alternatively, the separate audience location computation logic circuit 44 may be eliminated with the digitized signal output of the A/D converter 42 applied to the control command processor subsystem 14. Then the direction identifying function of the computation logic circuit 44 is performed by the control command processor subsystem 14.

The control command processor subsystem 14 utilizes the identified directions signal at line 46 from the audience location subsystem 18 to initiate operation of the distance measurement subsystem 20.

FIG. 4 provides a block diagram of a distance measurement subsystem 20 of the image recognition system 10. An ultrasound range module 48 drives the ultrasound transducer 32 for transmitting an ultrasonic burst signal and for receiving an echo signal responsive to an enable or initiate input signal applied by a transmitter controller device 50. An output echo signal of the ultrasound range module 48 is coupled to the control command processor subsystem 14 via a distance measurement logic circuit 52 which converts the echo signal to a suitable format for use by the control command processor subsystem 14. A sonar ranging module, for example, such as an integrated circuit device type SN28827 manufactured and sold by Texas Instruments may be used for the ultrasound range module 48. Bidirectional communications with the control command processor subsystem 14 at a line 54 include the processed echo signal output of the distance measurement logic circuit 52 and an input control signal to the transmitter controller 50.

The processed echo signal representative of distance between the scanner 12 and the located individual audience member is utilized by the control command processor subsystem 14 for adjusting the focus and zooming functions of the video camera 28.

FIG. 5 provides a block diagram representation of the control command processor subsystem 14 of the image recognition system 10. The control command processor subsystem 14 includes a central processing unit 56, such as, an Intel 80286 high performance 16-bit microprocessor with integrated memory management and adapted for multi-tasking systems and an associated memory device 58. The central processing unit 56 is programmable to perform the control and signal processing functions and includes, in known manner, asynchronous input signal timing and clock control bus timing functions. An interface device 60 is provided in conjunction with the central processing unit 56 to enable bidirectional communications between the image recognition system 10 and a host system for a particular application. The host system may be a home unit (not shown) of the type as described in U.S. Pat. No. 4,697,209 to David A. Kiewit and Daozheng Lu, and/or the data transfer device 16.

The control command processor subsystem 14 further may include an image display 62, a computer display 64 and a keyboard 66 for use during the installation of the image recognition system 10.

Control signals from the central processing unit 56 at a line 68 are applied to the illumination controller 22 for controlling illumination of the monitored area. Motor control signals at a line 70 from the central processing unit 56 are applied to the scanner controller 24 which are translated and applied to the stepping motor 36 at a line 36A. Feedback position signals may be provided to the central processing unit 56. Bidirectional communications are provided between the central processing unit 56 and the audience recognition subsystem 26 illustrated at a line 72.

FIGS. 6 and 7 provide a block diagram representation of the audience recognition subsystem 26. Referring initially to FIG. 6, a learning operational mode of the audience recognition subsystem 26 is illustrated. The infrared image output signal at line 28A of the infrared video camera 28 is applied to an image acquisition block 74 coupled to an analog-to-digital A/D converter 76 which generates a digital representation of the infrared image signal. A face image registration block 78 identifies a predetermined portion (m×n) pixels of the digitized image signal. The values of m and n are between 32 and 256, for example, such as a middle pixel image portion including m=50 and n=50. A gray-level subimage output of the face image registration block 78 at a line G-Sub is applied to a normalization block 80. The normalized output of block 80 is applied to a thresholding block 82 to provide a thresholded, binary level face image output at a line B-Sub. Each pixel of the (m×n) thresholded, binary level face or B-Sub image is represented by a single binary digit or bit, or 2500 bits for the 50×50 pixels. The B-Sub image signal is applied to a feature signature extraction block 84. An extracted pattern image signature output of the feature signature extraction block 84 is stored in both an individual face storage library (IFL) 86 and a universal face model (UFM) storage block 88. The universal face model UFM includes all the individual pattern image or face signatures stored within the individual face library IFL. A stop function flag is set at stop blocks 90 for updating the image libraries performed by the control command processor subsystem 14 as illustrated in FIG. 8A.

FIG. 6A provides a graphical representation of a B-sub image including m×n pixels. Each of the m×n pixels is either a zero or a one. The B-sub image pixel data is utilized to extract the pattern image signature for storing in the learning operational mode (FIG. 6) and to extract the pattern image signature for comparing with the universal image signature and the pattern image signatures in the recognition operational mode illustrated in FIG. 7.

In accordance with a feature of the invention, a pseudo random predetermined sequence of the m×n B-Sub image bits defines a predetermined number T of feature positions used for storing the extracted feature signature output of the feature signature extraction block 84. Each feature position has a predetermined length L, where the value of L is between 3 and 10. Considering a predetermined feature position of length L=7 and with the above example B-Sub image of 2500 bits, a pseudo random sequence of 2500/7 or 357 feature positions results or T=357. Each feature has a value between 0 and ($2^L$-1) or, for example, between 0 and 127 when L=7. A memory space of $2^L$ bits arranged as bytes b, where b equals $2^L/8$, is used for storing the possible feature values for each of the feature, positions or, for example, 2*7 or 128 bits or 16 bytes. Thus a total memory space for each of the pattern or face image signature and the universal pattern image signature equal T multiplied by b or, for example, 357 positions ×16 bytes/position or 5712 bytes.

FIG. 6A illustrates a plurality of feature positions i=0 through i=(T−1) generally designated by the reference character 84 corresponding to the feature extraction block 84. The corresponding memory space is represented by the reference character 86 corresponding to the IFL block 86. The first or i=0 feature position value is stored in a corresponding bit position B in a corresponding byte between 0 and (b−1) within the memory space 84. The logic steps performed for storing the individual face and the universal face model are described with respect to FIG. 8B.

A distinct memory space of a predetermined capacity is defined for the universal pattern image signature and each of the pattern image or individual face signatures within the image face library. For example, for a viewing audience including a defined number of audience members P, individual face signatures (T×P) are stored in both the corresponding IFL defined memory spaces (b×T×P) and the UFM defined memory space (b×T). Multiple face images are learned for each of the audience members P by sequentially processing a series of video images of the video camera 28 by the image signal processing blocks of FIG. 6 for each of the audience members. All of the resulting extracted pattern image signatures for each of the audience members are stored in the particular corresponding memory space of the IFL memory spaces.

FIG. 7 provides a block diagram representation of the recognition mode of the audience recognition subsystem 26. The digital representation of the infrared image signal from the analog-to-digital A/D converter 76 corresponding to an identified direction of an audience member by the audience location subsystem 18 is applied to a zooming and vertical strip image block 92. A first search area matrix (m×n)i is identified by a search area registration block 94. A gray-level subimage output G-Sub of the search area registration block 94 is applied to a normalization block 96. The normalized output of block 96 is applied to a thresholding block 98 to provide a thresholded, binary level search area image output B-Sub. The search area B-Sub image is compared with the universal pattern image signature at a block 100 labelled recognition for UFM.

If the decision at a block 102 is that the search area B-Sub image matches or exceeds a predetermined correlation threshold with the universal pattern image signature, then the search area B-Sub image is compared to identify a match with each of the pattern image signatures stored in the individual face library as illustrated at a block 104. Then or after a decision at block 102 that the search area B-Sub image does not match the universal pattern image signature, i is incremented by 1 or where $i=i+1$, at a block 106 so that a next search matrix $(m \times n)i$ is identified by the search area registration block 94 and processed as described for the first search area matrix.

After each of the search area matrices have been processed, more than one B-Sub image may be found that match the universal face model and an individual face library. The search area B-Sub image having the best matching rate or highest correlation with an individual face in the individual face library is identified at a conclusion block 108. The logic steps performed for recognizing the universal face model and the individual face are described with respect to FIG. 8B. An output or signal at a line 110 is then stored corresponding to the particular identified individual member of the viewing audience. The thus identified individual viewing member data can be stored together with other parameter data of a television data collection system, such as channel reception of a monitored receiver.

Referring to FIG. 8A, there is a main flow chart illustrating the logical steps performed by the control command processor subsystem 14 of the image recognition system 10. The sequential steps begin with an initialization routine. Then if a stop function is set, the pattern image signatures and universal pattern image signature memory spaces can be updated to include the IFL and UFM signatures stored at blocks 86 and 88 of FIG. 6. Otherwise, it is determined whether any function or mode has been selected, such as by a remote control or keyboard entry. If yes, then the selected function or mode is set or updated and then performed. Otherwise, the next sequential function or mode of modes 1–7 is performed.

FIG. 8B is a flow chart illustrating the logic steps performed for learning and recognizing the universal face model and the individual face. The sequential operations begin by setting a memory space address ADDR to the starting address with N-found set to zero. In the learning mode, an identified feature value from the B-Sub image is set to a corresponding bit position, starting with feature position $i=0$ and repeated for each feature position to $i=356$. The corresponding bit position B bit of ADDR +A byte, is determined by the particular feature value S, where S is between 0 and 127, A equals an integer value S/8 and B equals S mod 8 or the residue of S after A bytes. For example, a feature value $S=114$ from the B-Sub image for the feature position $i=0$ is set to the 2nd bit of ADDR +14 byte.

An individual audience member face image may be learned multiple times (R) with R possible different extracted signatures resulting, depending on any changed facial expressions or various profiles of the audience member. Each of the extracted feature signatures is sequentially stored within the corresponding pattern image signature memory space for the particular audience member by repeating the sequential signal processing of FIG. 6 and the learning or storing steps of FIG. 8B.

Otherwise if not in the learning mode, then the sequential steps for the recognition mode are performed, such as at the recognition for UFM block 100 when the search area B-Sub image is compared with the universal pattern image signature or at the block 104 when the search area B-Sub image is compared with individual pattern image signatures.

In the recognition mode, the identified feature value from the B-Sub image is compared to a corresponding bit position, starting with feature position $i=0$ and repeated for each feature position to $i=356$. If the corresponding bit position is set, a match is indicated and the N-found value is incremented by one. Otherwise, if the corresponding bit position is not set, nonmatching is indicated and the N-found value is not changed. The next incremental feature position is then compared to the corresponding bit position for the identified feature value.

After the last feature position $i=356$ has been identified and compared to identify a match, then the resulting N-found value is compared with a threshold value. If resulting N-found value is less than the threshold value, then a FALSE or no recognition for the UFM or the particular IFL is indicated. If resulting N-found value is greater than or equal to the threshold value, then a TRUE or a recognition of the UFM or the particular IFL is indicated.

FIG. 8C is a flow chart illustrating an operational function or mode 1 logical steps performed to add to the individual pattern image signatures and universal pattern image signature memory space or library. The sequential steps begin with a get and display a picture subroutine illustrated in FIG. 8D. Next a search all libraries subroutine illustrated in FIG. 8E is performed. The results are displayed and added to the library.

The get and display a picture subroutine of FIG. 8D starts with an image acquisition step (block 74 of FIG. 6). The infrared video image is processed (blocks 76, 78, 80 and 82 of FIG. 6) to provide a binary picture (B-sub image). A ratio of the ones in the resulting binary picture is calculated and the resulting binary picture is displayed.

In FIG. 8E, the search all libraries subroutine begins with a check of the exposure time based on the calculated ratio of ones and if adjustment is required then the sequential operation return without searching the libraries. Otherwise, if adjustment of the exposure time is not required, then an initial MAX value is set for the predetermined N-found value. A first library is searched (block 104 of FIG. 7 and FIG. 8B) and if the result N-found value is greater than the initial MAX value, then the MAX value is updated. Otherwise the MAX value is not changed. Then a next library is searched and the result is compared to the resulting MAX value and adjusted, until all the libraries have been searched.

FIG. 8F is a flow chart illustrating an operational function or mode 2 logical steps performed to verify and add to library. The sequential steps begin with the get and display the picture subroutine illustrated in FIG. 8D. Next the search all libraries subroutine illustrated in FIG. 8E is performed. The results are displayed and added to the identified correct library.

FIG. 8G is a flow chart illustrating an operational function or mode 3 logical steps performed to search and display. The sequential steps begin with a get and display the picture subroutine illustrated in FIG. 8D. Next the search all libraries subroutine illustrated in FIG. 8E is performed. The results are displayed.

FIG. 8H is a flow chart illustrating an operational function or mode 4 logical steps performed to locate head and search. The sequential steps begin with a search raw picture for heads subroutine illustrated in FIG. 8I. Next a locate and search head(s) subroutine illustrated in FIG. 8J is performed.

In FIG. 8I, the search raw picture for head(s) subroutine begins with a check of the exposure time and if adjustment is required, then the sequential operation return without performing any searching for heads. Otherwise, if adjustment of the exposure time is not required, then an initial MAX value is set for the predetermined N-found value and a search area pointer i is reset. The first search area matrix is identified and compared with the universal pattern image signature UFM (block 100 of FIG. 7). The result is compared with the set for the correlation threshold MAX value, and if the result is greater than the initial MAX value, then that search area pointer is saved and the MAX value is updated. Otherwise, the search area pointer is not saved and the MAX value is not changed. Then the search area pointer value is updated and the next search area matrix is identified and the sequential steps are repeated until the total raw picture has been searched.

FIG. 8J illustrates the locate and search head(s) subroutine performed by the control command processor subsystem 14 in the mode 4. If one search area pointer is stored in the subroutine of FIG. 8I, then the search area window is set to the identified search area matrix by the saved pointer value which corresponds to the head image portion. The exposure time is adjusted and the search all libraries subroutine of FIG. 8E is performed and the results are displayed.

Otherwise, if more than one pointer value are stored in the subroutine of FIG. 8I, then the MAX value is reset for a predetermined initial value. Then the search area window is set to the first identified search area matrix by the first saved pointer value which corresponds to a first head image portion. A local normalization is performed on the search area matrix data and the search all libraries subroutine of FIG. 8E is performed, and if the result is greater than the initial MAX value, then the MAX value is updated. Otherwise the MAX value is not changed. Then a next search area window is set to the next saved pointer value which corresponds to a next head image portion and the sequential steps are repeated until all the head image portions have been searched. Then the search area window is set to the identified search area matrix having the highest MAX value which corresponds to the head image portion. A local normalization is performed on the search area matrix data and the search all libraries subroutine of FIG. 8E is performed and the results are displayed.

FIG. 8K is a flow chart illustrating an operational function or mode 5 logical steps performed to scan and search the monitored area. The sequential steps begin with scanning of the monitored area. Then the video camera 28 is pointed to audience members within the monitored area and the mode 4 operations of FIG. 8H are performed.

Figure 8L:
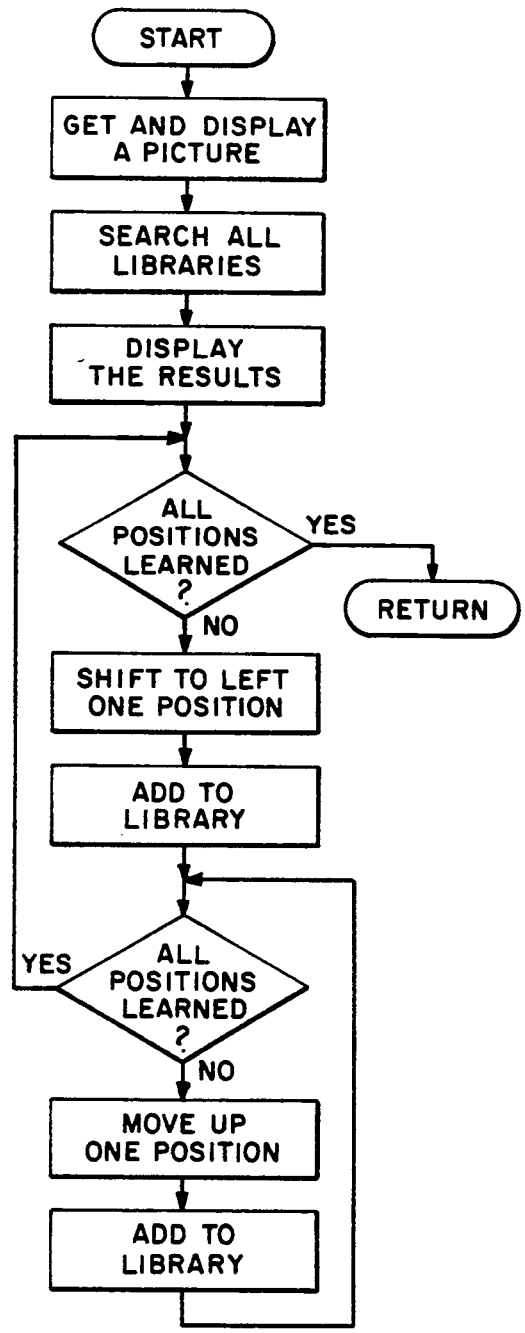

FIG. 8L is a flow chart illustrating an operational function or mode 6 logical steps performed to shift and learn. The sequential steps begin with the get and display the picture subroutine illustrated in FIG. 8D. Next the search all libraries subroutine illustrated in FIG. 8E is performed. The results are displayed and if all positions have been learned, then the sequential operation return without adding to the library. Otherwise, the audience member image is shifted to the left one position and added to the pattern image signature IFL and universal pattern image signature UFM. Then the audience member image is moved up one position and sequentially repeated until all positions have been learned and added to the library.

FIG. 8M is a flow chart illustrating an operational function or mode 7 logical steps performed to search and pause. The sequential steps begin with the search raw picture for heads subroutine illustrated in FIG. 8I. Next the locate and search head(s) subroutine illustrated in FIG. 8J is performed. Then if a continue decision is yes, the sequential mode 7 steps are repeated.

Although the present invention has been described in connection with details of the preferred embodiment, many alterations and modifications may be made without departing from the invention. Accordingly, it is intended that all such alterations and modifications be considered as within the spirit and scope of the invention as defined in the appended claims.

What is claimed and desired to be secured by Letters Patent is:

1. An image recognition system for identifying a predetermined pattern of a plurality of predetermined patterns in a video image comprising:
   means for storing a plurality of pattern image signatures, each of said pattern image signatures corresponding to one of the plurality of predetermined patterns;
   means for storing a universal pattern image signature, said universal pattern image signature corresponding to a composite signature of each of said pattern image signatures;
   means for sequentially comparing a predefined series of portions of the video image with said universal pattern image signature and for identifying matching video image portions; and
   means for comparing each of said identified matching video image portions with said stored pattern image signatures to identify the predetermined pattern.

2. An image recognition system as recited in claim 1 wherein said means for storing a plurality of pattern image signatures includes a distinct memory space having a predetermined capacity defined for each of said pattern image signatures.

3. An image recognition system as recited in claim 2 wherein said means for storing a universal pattern image signature includes a distinct memory space having said predetermined capacity.

4. An image recognition system as recited in claim 1 further comprises means for generating said plurality of pattern image signatures.

5. An image recognition system as recited in claim 4 wherein said pattern image signature generating means includes:
   means for capturing a video image of the predetermined pattern;
   means for processing said captured video image to provide a digitized image signal; and means for extracting a pattern signature from said digitized image signal.

6. An image recognition system as recited in claim 5 wherein said digitized image signal comprises a digitized gray level image.

7. An image recognition system as recited in claim 5 wherein said digitized image signal comprises a thresholded binary image.

8. An image recognition system as recited in claim 5 wherein said pattern signature extracting means comprises:
    means for defining a plurality of predefined feature positions from said digitized image signal;
    means for identifying a feature value for each of said plurality of predefined feature positions; and
    means for determining a memory location corresponding to said identified feature value for each of a plurality of predefined feature positions.

9. An image recognition system as recited in claim 8 wherein said predefined feature positions include a predetermined number L of pixels from said digitized image signal, each pixel is represented by a single binary digit.

10. An image recognition system as recited in claim 9 wherein said digitized image signal includes m×n binary digits and wherein said plurality of feature positions equals (m×n)/L.

11. An image recognition system as recited in claim 10 wherein said plurality of feature positions is defined by a pseudo random predetermined sequence of said m×n binary digits.

12. An image recognition system as recited in claim 9 wherein said feature value equals a value between 0 and $(2^L - 1)$.

13. An image recognition system as recited in claim 9 wherein a predetermined number equal, to $2^L$ of said memory locations are defined for each of said plurality of feature positions.

14. A method of identifying a predetermined pattern of a plurality of predetermined patterns in a video image comprising the steps of:
    storing a plurality of pattern image signatures, each of said pattern image signatures corresponding to one of the plurality of predetermined patterns;
    storing a universal pattern image signature, said universal pattern image signature corresponding to a composite signature of each of said pattern image signatures;
    sequentially comparing a predefined series of portions of the video image with said universal pattern image signature and identifying matching video image portions; and
    comparing each of said identified matching video image portions with said stored pattern image signatures to identify the predetermined pattern.

15. A method as recited in claim 14 wherein said step of sequentially comparing a predefined series of portions of the video image with said universal pattern image signature and identifying matching video image portions includes the steps of:
    processing said video image to provide a digitized image signal; and
    sequentially extracting and comparing a pattern signature from said predefined series of portions of said digitized image signal with said universal pattern image signature.

16. A method as recited in claim 15 wherein said step of sequentially extracting and comparing a pattern signature includes the steps of:
    identifying a feature value for each of a plurality of predefined feature positions from each of said digitized image signal portions;
    identifying and comparing a memory location corresponding to said identified feature value for each of said plurality of predefined feature positions with said universal pattern image signature;
    calculating the number of matching memory locations with said universal pattern image signature; and
    identifying matching video image portions responsive to said calculated number greater than a predetermined threshold value.

17. A method as recited in claim 16 wherein said step of comparing each of said identified matching video image portions with said stored pattern image signatures includes the steps of:
    extracting a pattern signature from said identified matching video image portions; and
    sequentially comparing said extracted pattern signature with each of said pattern image signatures.

18. A method as recited in claim 17 further comprising the step of identifying a matching value of said compared signatures and identifying matching signatures for said identified matching value greater than a predetermined threshold value.

19. A method as recited in claim 17 further comprising the step of identifying a highest matching value of said identified matching signatures to identify the predetermined pattern.

20. A method of generating a pattern image signature for use in image recognition system for identifying a predetermined pattern of a plurality of predetermined patterns in a video image, the image recognition system including a distinct pattern image signature memory space for storing each pattern image signature corresponding to one of the plurality of predetermined patterns and a universal image memory space for storing a universal pattern image signature, the universal pattern image signature corresponding to a composite signature of each of the pattern image signatures; said method comprising the steps of:
    capturing a video image of the predetermined pattern;
    processing said captured video image to provide a digitized image signal;
    identifying a feature value from said digitized image signal for each of a plurality of predefined feature positions;
    identifying a memory location corresponding to said identified feature value for each of a plurality of predefined feature positions;
    storing a binary digit one in said identified memory locations in the pattern image signature memory space corresponding to the predetermined pattern; and
    storing a binary digit one in corresponding memory locations in said universal image memory space.

21. A method as recited in claim 20 further comprising capturing at least one subsequent video image of the predetermined pattern and sequentially repeating the pattern image signature generating steps.

22. An image recognition system for identifying predetermined individual members of a viewing audience in a monitored area:

memory means for storing a plurality of pattern image signatures, each of said pattern image signatures corresponding to one of the predetermined individual members;

means for storing a universal pattern image signature, said universal pattern image signature corresponding to a composite signature of each of said pattern image signatures;

audience scanning means for locating individual members in the monitored area;

means for capturing a video image of each said located individual member in the monitored area;

means for sequentially comparing a predefined series of portions of each said captured video image with said universal pattern image signature and for identifying matching video image portions; and means for comparing each of said identified matching video image portions with said stored pattern image signatures to identify at least one of the predetermined individual members.

23. An image recognition system as recited in claim 22 wherein said audience scanning means for locating the individual members includes an infrared detector for providing a temperature representative signal of the monitored area.

24. An image recognition system as recited in claim 23 wherein said temperature representative signal is processed to provide a direction signal.

25. An image recognition system as recited in claim 22 wherein said video image capturing means includes an infrared video camera for providing a video image signal.

26. An image recognition system as recited in claim 22 wherein said comparing means includes:
means for processing said captured video image to provide a digitized image signal; and
means for extracting a pattern signature from said digitized image signal.

27. An image recognition system as recited in claim 26 wherein said digitized image signal comprises a digitized gray level image.

28. An image recognition system as recited in claim wherein said digitized image signal comprises a thresholded binary image.

29. An image recognition system as recited in claim 26 wherein said pattern signature extracting means includes:
means for defining a plurality of predefined feature positions from said digitized image signal;
means for identifying a feature value for each of said plurality of predefined feature positions; and
means for identifying a memory location corresponding to said identified feature value for each of said plurality of predefined feature positions.

30. An image recognition system as recited in claim 29 wherein said comparing means further includes:
means for calculating a number of matching memory locations with said universal pattern image signature; and
means for identifying a matching video image portion responsive to said calculated number greater than a predetermined threshold value.

31. An image recognition system as recited in claim 29 wherein said comparing means further includes:
means for calculating a number of matching memory locations with each of said pattern image signatures; and means for identifying a match value responsive to said calculated number greater than a predetermined threshold value.

32. An image recognition system as recited in claim 31 wherein said comparing means further includes:
means for identifying a highest matching value to identify the predetermined audience member.

33. A method of identifying predetermined individual members of a viewing audience in a monitored area:
storing a plurality of pattern image signatures, each of said pattern image signatures corresponding to one of the predetermined individual members;
storing a universal pattern image signature, said universal pattern image signature corresponding to a composite signature of each of said pattern image signatures;
scanning the monitored area and generating a temperature representative signal of the monitored area;
processing said generated temperature representative signal and providing individual members direction signal corresponding to located individual members;
capturing a video image of each located individual member responsive to said individual members direction signal in the monitored area;
sequentially comparing a predefined series of portions of the captured video image with said universal pattern image signature and identifying matching video image portions; and
comparing each of said identified matching video image portions with said stored pattern image signatures to identify at least one of the predetermined individual members.

34. A method as recited in claim 33 wherein said step of sequentially comparing a predefined series of portions of the captured video image with said universal pattern image signature and identifying matching video image portions includes the steps of:
processing said captured video image to provide a digitized image signal; and
sequentially extracting and comparing a pattern signature from said predefined series of portions of said digitized image signal with said universal pattern image signature.

35. A method as recited in claim 34 wherein said step of sequentially extracting and comparing a pattern signature includes the steps of:
identifying a feature value for each of a plurality of predefined feature positions from each of said digitized image signal portions;
identifying and comparing a memory location corresponding to said identified feature value for each of said plurality of predefined feature positions with said universal pattern image signature;
calculating the number of matching memory locations with said universal pattern image signature; and
identifying matching video image portions responsive to said calculated number greater than a predetermined threshold value.

36. A method as recited in claim 35 wherein said step of comparing each of said identified matching video image portions with said stored pattern image signatures includes the steps of:
extracting a pattern signature from said identified matching video image portions; and
sequentially comparing said extracted pattern signature with each of said pattern image signatures.

37. A method as recited in claim 36 further comprising the step of identifying a matching value of said compared signatures and identifying matching signatures for said identified matching value greater than a predetermined threshold value.

38. A method as recited in claim 37 further comprising the step of identifying a highest matching value of said identified matching signatures to identify the predetermined individual members.

39. A method as recited in claim 33 wherein said steps of storing said plurality of pattern image signatures and said universal image signature includes the steps of:

provliding a plurality of distinct pattern image signature memory spaces for storing each of said pattern image signatures;

providing a universal pattern image memory space for storing said universal pattern image signature;

capturing a video image of the predetermined individual member;

processing said captured video image to provide a digitized image signal;

identifying a feature value from said digitized image signal for each of a plurality of predefined feature positions;

identifying a memory location corresponding to said identified feature value for each of a plurality of predefined feature positions; and storing a binary digit one in said identified memory locations in the pattern image signature memory space corresponding to the predetermined individual member and in the universal pattern image memory space.

40. A method as recited in claim 39 further comprising capturing at least one subsequent video image of the predetermined individual member and sequentially repeating the processing, identifying and storing steps for each captured video image.

* * * * *

UNITED STATES PATENT AND TRADEMARK OFFICE
CERTIFICATE OF CORRECTION

PATENT NO. : 5,031,228
DATED     : July 9, 1991
INVENTOR(S) : Daozheng Lu

It is certified that error appears in the above-identified patent and that said Letters Patent is hereby corrected as shown below:

Column 11, claim 13, line 37, the comma after "equal" should be deleted;

Column 12, claim 20, line 35, after "in", --an-- should be inserted;

Column 13, claim 28, line 43, after "claim", --26-- should be inserted;

Column 15, claim 39, line 19, "member" should be changed to --members--;

Column 16, claim 39, line 12, "member" should be changed to --members--; and

Column 16, claim 40, line 16, "member" should be changed to --members--.

Signed and Sealed this

First Day of December, 1992

*Attest:*

DOUGLAS B. COMER

*Attesting Officer*     Acting Commissioner of Patents and Trademarks